(12) United States Patent
Shidler et al.

(10) Patent No.: US 6,918,237 B2
(45) Date of Patent: Jul. 19, 2005

(54) FEEDER POSITION SENSOR

(75) Inventors: Treg Shidler, Eldridge, IA (US); Dale W. Panoushek, Orion, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/623,726

(22) Filed: Jul. 21, 2003

(65) Prior Publication Data

US 2005/0016146 A1 Jan. 27, 2005

(51) Int. Cl.$^7$ .............................................. A01D 61/00
(52) U.S. Cl. .................... 56/16.4 R; 56/10.2 E
(58) Field of Search ................. 56/10.2 E, 10.2 R, 56/16.4 R

(56) References Cited

U.S. PATENT DOCUMENTS

| | | | |
|---|---|---|---|
| 3,398,516 A | 8/1968 | Quick ........................ 56/208 |
| 3,540,028 A | 11/1970 | Love .......................... 340/267 |
| 3,967,437 A | 7/1976 | Mott et al. ................... 56/10.2 |
| 4,332,126 A | * 6/1982 | Van Auwelaer et al. . 56/10.2 R |
| 4,567,719 A | * 2/1986 | Soots et al. ................... 56/364 |
| 4,594,840 A | * 6/1986 | D'Almeida et al. ......... 56/11.2 |
| 4,776,153 A | * 10/1988 | DePauw et al. ......... 56/10.2 E |
| 5,072,577 A | 12/1991 | Lokken ...................... 56/208 |
| 5,455,769 A | 10/1995 | Panoushek et al. .... 364/424.07 |
| 5,653,292 A | 8/1997 | Ptacek et al. .................. 172/4 |
| 5,856,743 A | 1/1999 | Juniman ................. 324/207.25 |
| 6,202,395 B1 * | 3/2001 | Gramm .................... 56/10.2 E |
| 6,322,404 B1 | 11/2001 | Magee et al. .................. 440/2 |
| 2002/0069628 A1 | 6/2002 | Metzger ..................... 56/10.2 |
| 2003/0020466 A1 | 1/2003 | Lewis .................. 324/207.21 |

* cited by examiner

*Primary Examiner*—Meredith Petravick
(74) *Attorney, Agent, or Firm*—Brant T. Maurer; Rebecca Henkel

(57) ABSTRACT

A mounting assembly and a rotational position sensor adapted for indicating a rotational position of a feeder of an agricultural combine relative to a frame or chassis supporting the feeder for rotation, utilizing a transfer shaft for connecting a rotatable element of the sensor to a rotatable member of the feeder, which can be a pivot member or pin which pivotally supports the feeder on the combine frame or chassis for rotation relative thereto about an axis through the center of the pivot member or pin. The transfer shaft is held or captured in a housing of the mounting assembly that also supports the sensor, the shaft being allowed to rotate about an axis of rotation of the rotatable element of the sensor. A mounting bracket holds the housing and the sensor on the combine in a predetermined, fixed position and orientation, for holding the protruding end of the shaft in engagement with the rotatable member.

13 Claims, 2 Drawing Sheets

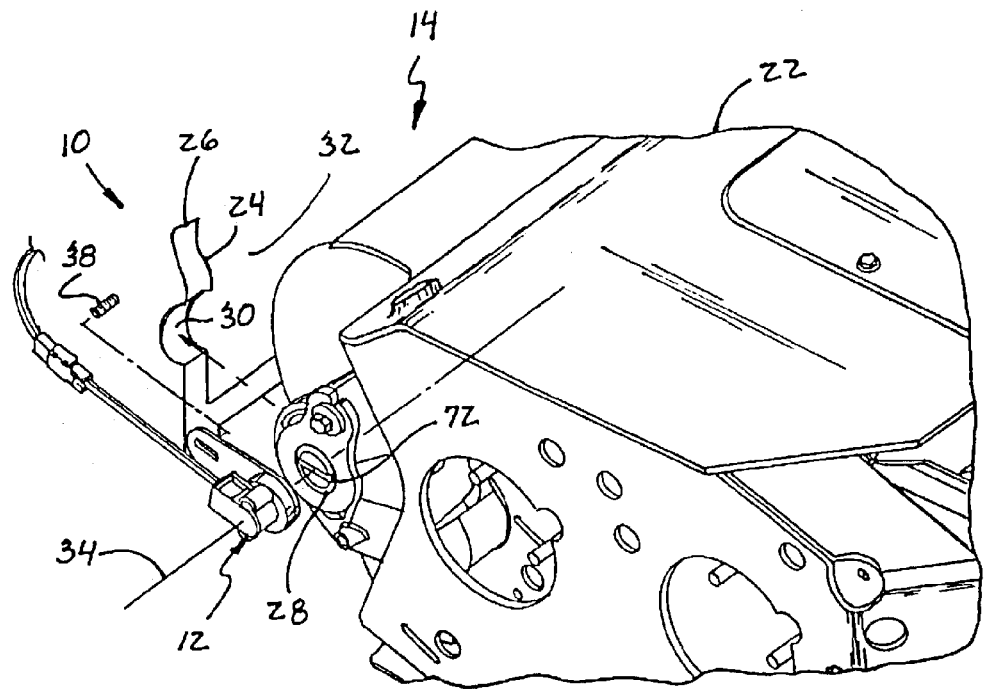
Fig. 2
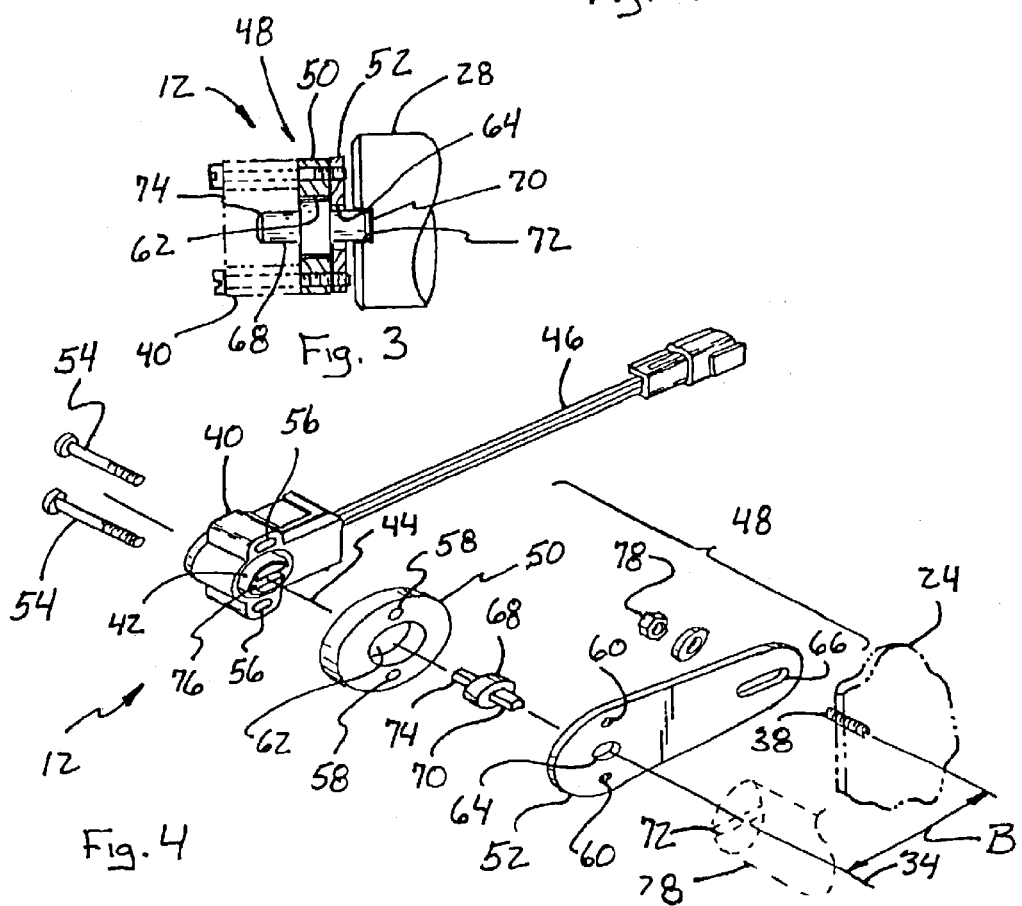
Fig. 3
Fig. 4

FEEDER POSITION SENSOR

TECHNICAL FIELD

This invention relates generally to a sensor for determining a rotational position of a feeder on an agricultural combine, and more particularly, to a feeder position sensor and mount for the frame or chassis of a combine in connection to a rotatable pivot member or pin of the feeder, which eliminates the need for complex and exposed linkages which can be difficult to install, can be damaged and require adjustment.

BACKGROUND

Commonly, sensors are used for determining and monitoring the angular orientation of the feeder of an agricultural combine relative to the frame or chassis of the combine, as an indication of the feeder and header height relative to the combine and the ground. In the past, such sensors have typically included some kind of external linkage, which has been found to require adjustment during installation and periodically after use, and, as a result of the location thereof, can be damaged due to contact with obstacles. The known sensors can also collect chaff and other crop material. Reference in this regard, Mott et al. U.S. Pat. No. 3,967,437, issued Jul. 6, 1976 to Deere & Company; and Lokken U.S. Pat. No. 5,072,577, issued Dec. 17, 1991.

Thus, what is sought is a position sensor for the feeder and header of an agricultural combine which can provide an accurate indication of the height of the feeder and header relative to the combine and the ground, which overcomes many of the shortcomings and problems set forth above.

SUMMARY

What is disclosed is a mounting assembly and a rotational position sensor adapted for indicating a rotational position of a feeder of an agricultural combine relative to a frame or chassis supporting the feeder for rotation, which overcomes many of the shortcomings and problems set forth above. According to the invention, the sensor can be a common electrical device, such as, but not limited to, a potentiometer or a Hall effect sensor, operable for sensing rotation of a rotatable element and outputting an electrical signal representative thereof. In a preferred embodiment of a mounting assembly for the position sensor, a transfer shaft connects the rotatable element to a rotatable member of the feeder, which is preferably a pivot member or pin which pivotally supports the feeder on the combine frame or chassis for rotation relative thereto about an axis through the center of the pivot member or pin. The transfer shaft is held or captured in a housing of the mounting assembly that also supports the sensor, the shaft being allowed to rotate about an axis of rotation of the rotatable element of the sensor. An end of the transfer shaft cooperatively engageable with the pivot member or shaft protrudes from the housing. The housing additionally includes a mounting bracket for mounting on the frame or chassis of the combine, for holding the housing and the sensor in a predetermined, fixed position and orientation, for holding the protruding end of the shaft in engagement with the pivot member or pin for rotation therewith.

As a result, the sensor is mounted on the frame or chassis, and the transfer shaft connects the rotatable element of the sensor with the pivoting member of the feeder for rotation with the feeder about its rotational axis. The sensor can be easily installed using a simple fastener such as a threaded nut or the like, and can be easily removed. Because the transfer shaft is contained in the housing and is aligned with the rotational axis, it can be relatively short and compact, so as to provide only a small area for collection of crop residue and the like, and it presents little risk of damage from contact with obstacles and the like. Additionally, little or no adjustment is required.

BRIEF DESCRIPTION OF THE DRAWINGS

FIG. 2 is a fragmentary perspective view showing the sensor of the invention in position for installation onto a frame member of the combine and the relationship of the sensor to a pivot pin of the feeder;

FIG. 3 is a sectional view of a mounting assembly of the sensor, showing a transfer shaft thereof cooperatively engaged with the pivot pin of the feeder and showing the sensor in phantom; and FIG. 4 is an exploded representation of the sensor and mounting assembly thereof, and showing the pivot pin of the feeder and the frame member of the combine in phantom.

DETAILED DESCRIPTION OF THE PREFERRED EMBODIMENTS

Figure 1:
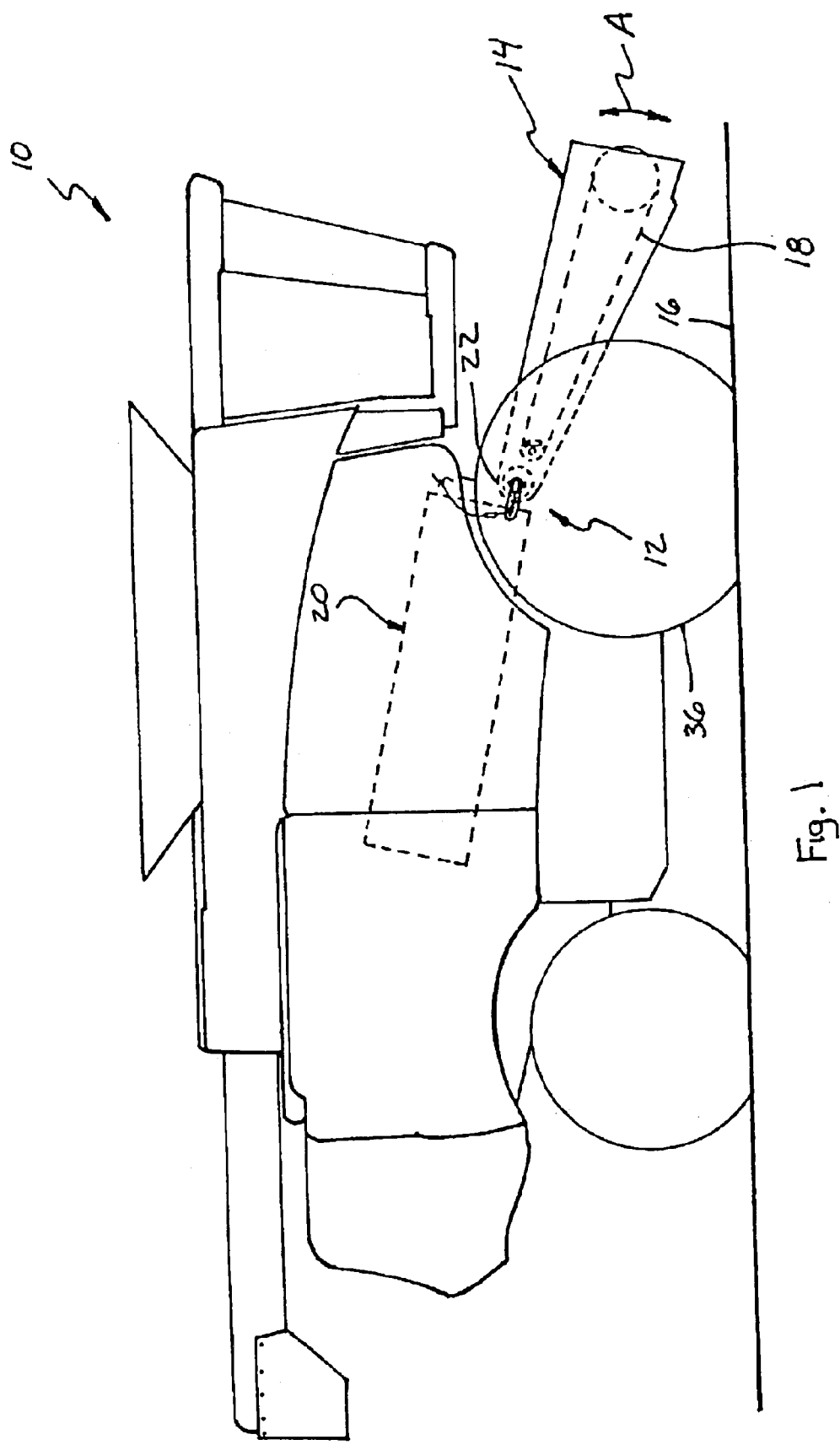
FIG. 1 is simplified, side elevational view of an agricultural combine including a feeder position sensor according to the present invention.

In FIG. 1, an agricultural combine 10 is shown, including a feeder position sensor 12 constructed and operable according to the teachings of the present invention, for detecting or sensing a rotational position of a feeder 14 relative to a forward end of combine 10, as denoted by arrow A, for positioning a header (not shown) mounted on a forward end of feeder 14 at a desired elevation above a ground surface, denoted by line 16. Generally, in operation, the header on the forward end of feeder 14 will sever crops at a desired elevation above ground surface 16, gather the severed crops to a mouth or opening on the forward end of feeder 14, and a feeder conveyor 18 within feeder 14 will move or convey the crops upwardly and rearwardly to a threshing mechanism 20 within combine 10. Threshing mechanism 20 will then thresh grain and smaller portions of the crops from stalks, cobs, straw and the like, and discharge the grain and other smaller pieces of crop material to a cleaning system (not shown) within combine 10 for separation of the grain from material other than grain (MOG), all in the well known manner. When operating the header, it is desirable to have the ability to adjust the height at which the crops are cut off, and adjustments in header height may be required frequently, particularly in hilly and rolling fields. Also, typically, the header height is adjusted by pivoting or rotating feeder 14 upwardly and downwardly about a rotational axis adjacent a rearward end 22 thereof.

Referring also to FIG. 2, rearward end 22 of feeder 14 is shown in position for mounting on a frame member 24 of a forward end 26 of combine 10. Essentially, rearward end 22 of feeder 14 includes a pair of axially aligned, sidewardly extending pivot pins 28, which are cooperatively receivable in forwardly open semi-circular receivers 30 adjacent opposite sides of an inlet opening 32 and forward end 26. Feeder 14 is supportable with pivot pins 28 in receivers 30 in any suitable manner, such as using one or more fluid cylinders (not shown) extendable and retractable for pivotally rotating feeder 14 about an axis 34 through pivot pins 28 for raising and lowering the header. As can be seen in FIG. 1, rearward end 22 of feeder 14 is disposed inwardly of front wheels 36 of combine 10, it being anticipated that the header mounted on feeder 14 can extend sidewardly well beyond the sideward extent of wheels 36. Thus, pivot pins 28 are in locations that will be largely protected from contact with obstacles that may be encountered as combine 10 moves over an agricultural field, making such location well suited for a sensor for sensing a rotational position of feeder 14 about rotational axis 34. Feeder position sensor 12 is shown in position for mounting on a stud or bolt 38 projecting sidewardly from a side of frame member 24 in predetermined spaced relation to spade or receiver 30, so as to be aligned with and cooperatively engage pivot pin 28.

Referring also to FIGS. 3 and 4, feeder position sensor 12 preferably includes a conventionally constructed and operable electrical sensor device 40, including a potentiometer or Hall effect device including circuitry which outputs a signal indicative of a rotational position of a rotatable element 42 about an axis of rotation 44, over an output wire 46. Output wire 46 includes a conventional connector for connection to a wiring harness of combine 10, also in the conventional, well known manner.

Sensor 12 includes a mounting assembly 48 for mounting in position on frame member 24 using bolt 38. Mounting assembly 48 includes a housing 50 and a mounting bracket 52 mountable to electrical device 40 using a pair of screws 54 which pass through slots 56 in electrical device 40 and holes 58 in housing 50 and threadedly engage threaded holes 60 in bracket 52. Housing 50 is preferably an annular member having a hole 62 therethrough which is positioned in axially aligned relation with rotatable element 42 about axis 44. Mounting bracket 52 is preferably an elongate member including one end having a hole 64 therethrough which is smaller than hole 62 and which is also axially aligned with rotatable element 42. The opposite end of mounting bracket 52 preferably includes an elongate slot 66 therethrough which receives bolt 38 for fixedly mounting bracket 52 to frame member 24 with rotatable element 42 and holes 62 and 64 at least substantially axially aligned with pivot pin 28. The predetermined distance between axis 34 of pivot pin 28 and bolt 38 is denoted by distance B in FIG. 4, which corresponds to an approximate distance between the centers of hole 64 and slot 66 through mounting bracket 52, which allows achieving axial alignment of rotatable element 42 with pivot pin 28. Also, mounting assembly 48 includes a transfer shaft 68 having a first end portion 70 having a size and shape sufficiently small so as to protrude through hole 64 of mounting bracket 52. End portion 70 is adapted to cooperatively engage pivot pin 28 so as to rotate transfer shaft 68 when pivot pin 28 is rotated. In this regard, first end portion 70 preferably has a blade shape which is cooperatively receivable in a transverse slot 72 in the end of pin 28. Transfer shaft 68 additionally includes a second end portion 74 which is larger in transverse extent compared to first end portion 70 so as to not be capable of passing through hole 64 of bracket 52, but which is capable of being positioned in hole 62 of housing 50. Second end portion 74 is additionally cooperatively engageable with rotatable element 42 so as to be capable of correspondingly rotating it when shaft 68 is rotated by pivot pin 28. In this regard, end portion 74 preferably also has a blade shape which is cooperatively receivable in a transversely extending slot 76 in rotatable element 42.

Thus, when feeder position sensor 12 is mounted by mounting assembly 48 on frame member 24, first end portion 70 of transfer shaft 68 will be received in slot 72 of pivot pin 28, such that transfer shaft 68 will rotate therewith and transfer the rotational movement to rotatable element 42 of electrical device 40, which will then output a signal representative of a rotational position of pivot pin 28. Pivot pin 28 is fixedly mounted on feeder 14, such that the pivotal position of pivot pin 28 will be representative of a rotational or pivotal position of feeder 14, and thus a height of a header mounted thereon.

As an advantage of the present feeder position sensor 12, it is apparent that by the location of sensor 12, there is a lessened possibility of contact with obstacles and potentially damaging items during the movement of combine 10. As another advantage, installation of sensor 12 is simple and easy, requiring only mounting of bracket 52 on frame member 24, for instance, by passing bolt 38 through slot 66 and securing with a nut 78, then attaching output wire 46. Removal and replacement is also simple and convenient, by removal of nut 78 and disconnection of wire 46. Additionally, no significant adjustment is required beyond simply aligning end portion 70 of transfer shaft 68 with slot 72 of pin 38.

As another advantage, during operation, if rotatable element 42 of device 40 is not exactly aligned with pivot pin 28, such as due to inexact alignment at installation, wear, and or slight jarring contact with another object, transfer shaft 68 will be able to rock within slots 72 and 78 such that the device will still be functional and accurate.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A mounting assembly for a rotational position sensor for mounting on a first member and sensing a rotational position of a second member supported on the first member for rotation relative thereto, comprising:

a transfer shaft having a first end cooperatively engageable with a rotatable sensor element of the sensor for rotating the sensor element when the transfer shaft is rotated, and a second end cooperatively engageable with, and non-rigidly attached to, the second member for rotation of the transfer shaft therewith; and a housing for supporting and holding the sensor and the transfer shaft with the first end of the shaft in engagement with the rotatable sensor element and the second end positioned for engaging the rotatable second member, the housing being mountable in a fixed position and orientation on the first member such that the second end of the transfer shaft is engaged with the rotatable second member for rotation therewith.

2. The mounting assembly of claim 1, wherein the housing includes an elongate bracket having one end for mounting on the first member, and an opposite end for mounting the sensor thereon in the fixed position and orientation and including a hole therethrough for holding the second end of the transfer shaft in position for engagement with the rotatable second member.

3. The mounting assembly of claim 1, wherein the ends of the transfer shaft include blades cooperatively receivable in slots in the sensor element and the rotatable second member, respectively, and extending transversely to an axis of rotation of the second member.

4. The mounting assembly of claim 1, wherein the first member comprises a frame member on a front end of an agricultural combine, and the second member comprises a pivot pin fixedly mounted on a feeder for supporting the feeder for rotation on the frame member.

5. A mounting assembly for a rotational position sensor for mounting on a frame member of an agricultural combine and sensing a rotational position of a feeder supported on the combine for rotational movement relative thereto, comprising:

a transfer shaft having a first end cooperatively engageable with a rotatable element of the position sensor and an opposite second end cooperatively, coaxially engageable with a pivot pin on the feeder through which an axis of rotation of the feeder extends, such that rotation of the feeder and the pin about the axis will rotate the transfer shaft;

a housing for holding the transfer shaft with the first end in engagement with the rotatable element of the sensor for rotation therewith; and a mounting bracket having a mounting end for mounting on the frame member such that an opposite end of the bracket will be positioned in a predetermined position in closely spaced relation to the pivot pin of the feeder, the opposite end including a hole therethrough aligned with the axis of rotation when in the predetermined position, being adapted for holding the second end of the transfer shaft in position for engagement with the pivot pin and supporting the housing and the sensor in axial alignment therewith.

6. The mounting assembly of claim 5, wherein the ends of the transfer shaft include blades cooperatively receivable in slots in the rotatable element of the sensor and the rotatable second member, respectively, and extending transversely to an axis of rotation of the second member.

7. The mounting assembly of claim 5, wherein the second end of the transfer shaft is smaller in transverse extent compared to the first end and the hole in the end of the mounting bracket has a large enough transverse extent so as to allow passage of the second end of the transfer shaft therethrough but not the first end.

8. A rotational position sensor assembly for mounting on a frame member of an agricultural combine and sensing a rotational position of a feeder supported on the combine for rotational movement relative thereto, comprising:

a sensor including a rotatable element and circuitry for outputting a signal indicative of a rotational, position of the rotatable element;

a transfer shaft having a first end portion including an element cooperatively engageable with the rotatable element of the sensor for rotation therewith and an opposite second end portion including an element cooperatively engageable with a pivot pin on the feeder through which an axis of rotation of the feeder extends, such that rotation of the feeder and the pin about the axis will rotate the transfer shaft and the rotatable element of the sensor; and a housing for receiving the transfer shaft with the element of the first end portion thereof in engagement with the rotatable element of the sensor for rotation therewith, including a bracket having a mounting end for mounting on the frame member such that an opposite end of the bracket will be positioned in a predetermined position in closely spaced relation to the pivot pin of the feeder, the opposite end including a hole therethrough that will be at least generally aligned with the axis of rotation when in the predetermined position and being adapted for holding the second end portion of the transfer shaft in position for cooperative engagement of the element thereof with the pivot pin and supporting the housing and the sensor at least generally in axial alignment therewith.

9. The rotational position sensor of claim 8, wherein the end portions of the transfer shaft include blades cooperatively receivable in slots in the rotatable element of the sensor and the rotatable second member, respectively, and extending transversely to an axis of rotation of the pivot pin.

10. A mounting assembly for a rotational position sensor for mounting on a first member and sensing a rotational position of a second member supported on the first member for rotation relative thereto, comprising:

a transfer shaft having a first end cooperatively engageable with a rotatable sensor element of the sensor for rotating the sensor element when the transfer shaft is rotated, and a second end cooperatively engageable with the second member for rotation of the transfer shaft therewith, wherein the ends of the transfer shaft include blades cooperatively receivable in slots in the sensor element and the rotatable second member, respectively, and extending transversely to an axis of rotation of the second member; and a housing for supporting and holding the sensor and the transfer shaft with the first end of the shaft in engagement with the rotatable sensor element and the second end positioned for engaging the rotatable second member, the housing being mountable in a fixed position and orientation on the first member such that the second end of the transfer shaft is engaged with the rotatable second member for rotation therewith.

11. A mounting assembly for a rotational position sensor for mounting on a frame member of an agricultural combine and sensing a rotational position of a feeder supported on the combine for rotational movement relative thereto, comprising:

a transfer shaft having a first end cooperatively engageable with a rotatable element of the position sensor and an opposite second end cooperatively engageable with, and non-rigidly attached to, a pivot pin on the feeder through which an axis of rotation of the feeder extends, such that rotation of the feeder and the pin about the axis will rotate the transfer shaft;

a housing for holding the transfer shaft with the first end in engagement with the rotatable element of the sensor for rotation therewith; and a mounting bracket having a mounting end for mounting on the frame member such that an opposite end of the bracket will be positioned in a predetermined position in closely spaced relation to the pivot pin of the feeder, the opposite end including a hole therethrough aligned with the axis of rotation when in the predetermined position, being adapted for holding the second end of the transfer shaft in position for engagement with the pivot pin and supporting the housing and the sensor in axial alignment therewith.

12. A mounting assembly for a rotational position sensor for mounting on a frame member of an agricultural combine and sensing a rotational position of a feeder supported on the combine for rotational movement relative thereto, comprising:

a transfer shaft having a first end cooperatively engageable with a rotatable element of the position sensor and an opposite second end cooperatively engageable with a pivot pin on the feeder through which an axis of rotation of the feeder extends, such that rotation of the feeder and the pin about the axis will rotate the transfer shaft, wherein the ends of the transfer shaft include blades cooperatively receivable in slots in the rotatable element of the sensor and the rotatable second member, respectively, and extending transversely to an axis of rotation of the second member;

a housing for holding the transfer shaft with the first end in engagement with the rotatable element of the sensor for rotation therewith; and a mounting bracket having a mounting end for mounting on the frame member such that an opposite end of the bracket will be positioned in a predetermined position in closely spaced relation to the pivot pin of the feeder, the opposite end including a hole therethrough aligned with the axis of rotation when in the predetermined position, being adapted for holding the second end of the transfer shaft in position for engagement with the pivot pin and supporting the housing and the sensor in axial alignment therewith.

13. A mounting assembly for a rotational position sensor for mounting on a frame member of an agricultural combine and sensing a rotational position of a feeder supported on the combine for rotational movement relative thereto, comprising:

a transfer shaft having a first end cooperatively engageable with a rotatable element of the position sensor and an opposite second end cooperatively engageable with a pivot pin on the feeder through which an axis of rotation of the feeder extends, such that rotation of the feeder and the pin about the axis will rotate the transfer shaft, wherein the second end of the transfer shaft is smaller in transverse extent compared to the first end and the hole in the end of the mounting bracket has a large enough transverse extent so as to allow passage of the second end of the transfer shaft therethrough but not the first end;

a housing for holding the transfer shaft with the first end in engagement with the rotatable element of the sensor for rotation therewith; and a mounting bracket having a mounting end for mounting on the frame member such that an opposite end of the bracket will be positioned in a predetermined position in closely spaced relation to the pivot pin of the feeder, the opposite end including a hole therethrough aligned with the axis of rotation when in the predetermined position, being adapted for holding the second end of the transfer shaft in position for engagement with the pivot pin and supporting the housing and the sensor in axial alignment therewith.

* * * * *